UNITED STATES PATENT OFFICE.

PROSPER CABRIÉ, OF NEW YORK, N. Y.

MANUFACTURE OF ARTIFICIAL STONE.

SPECIFICATION forming part of Letters Patent No. 679,828, dated August 6, 1901.

Application filed October 22, 1900. Serial No. 33,959. (No specimens.)

*To all whom it may concern:*

Be it known that I, PROSPER CABRIÉ, a citizen of France, residing at New York city, in the county of New York and State of New York, have invented certain new and useful Improvements in the Manufacture of Artificial Stone, of which the following is a specification.

This invention relates to the manufacture of artificial stone suitable for building material, which can be left exposed to the air and changes of weather and be free from efflorescence, and thereby dispensing with repeated painting and also possessing strength and hardness.

It consists of the combination of ingredients, as will be hereinafter particularly described, and specifically defined in the claims.

The composition of materials and the treatment of said materials to obtain an artificial stone closely imitating light-shade natural sandstone, mainly for ornamentations and moldings and at greatly-reduced cost, is substantially by the union of the following substances in the proportions given, as follows: twenty-five kilos of Portland cement, mark "grapier," which is light gray and hardens slowly; seventy-five kilos of Portland cement, mark "Roqueford," which is yellow and hardens quickly; twenty-five kilos of gray hydraulic lime which has been slaked with water having twenty per cent. of sulfuric acid and dried and powdered, and one hundred kilos of sand which has been washed with soft water and dried. The above materials are thoroughly mixed together as one material, which is placed in barrels and the latter closed to exclude dampness, or it may be used immediately after the mixture has been made.

The treatment of the above composition to obtain moldings of artificial stone is as follows: Said composition is dumped on a floor or in a suitable trough, water is added and mixed with it to produce the proper consistency, as commonly done with cements, and a portion of it is poured and evenly distributed into molds. Said molds may be of plaster-of-paris or of gelatin, the latter being preferred, as the cement composition sets rapidly in ten or twelve minutes. The reproduction is thus obtained and the mold is removed without any material injury or wear to said mold, as it has a certain amount of elasticity. Within a few hours after the artificial stone has been molded, and thus preferably while it is still damp, its smooth-appearing surface is removed with some of the well-known tools used by stone-cutters and sculptors, after which the sample of stone is left to dry in the shade for ten or twelve days, after which it is washed with water containing twenty to twenty-five per cent. of muriatic acid, which indurates the stone and removes any appearing saltpeter.

When the artificial stone is made directly upon the face of walls, the same materials are used in the proportions above given, following the well-known rules employed in working with cement. The surface is then roughened, if desired, within a few hours and before it is too dry, and ten or twelve days later the face of the stone is washed with water containing twenty per cent. of muriatic acid.

The above-named brands of cement used are preferred, because they combine well together and the stone obtained is free from saltpeter efflorescence; but other brands having the same characterized qualities may be used to obtain the desired artificial stone.

Having now fully described my invention, I claim—

1. An indurated artificial stone having a rough surface, and comprised of a slowly-hardening Portland cement, a quickly-hardening Portland cement, hydraulic lime slaked with water containing sulfuric acid, and sand, as described and in the proportions substantially as set forth.

2. The process of manufacturing an artificial stone having a rough surface, which comprises a mixture of slowly-hardening Portland cement, a quickly-hardening Portland cement, hydraulic lime slaked with acidulated water, and sand, in the proportions set forth, with water, pouring the whole into molds and allowing the mixture to set, then removing the stone thus formed, roughening its surface, drying it, and finally washing it with water containing twenty per cent. of muriatic acid, substantially as described.

In testimony whereof I affix my signature in presence of two witnesses.

PROSPER CABRIÉ.

Witnesses:
E. E. MASSON,
R. F. STORM.